June 17, 1947.  E. WILDHABER  2,422,326
VARYING LEVERAGE GEARS
Filed Aug. 2, 1945  3 Sheets-Sheet 1

INVENTOR.
ERNEST WILDHABER
BY

June 17, 1947.  E. WILDHABER  2,422,326
VARYING LEVERAGE GEARS
Filed Aug. 2, 1945  3 Sheets-Sheet 2

INVENTOR.
ERNEST WILDHABER
BY

June 17, 1947.  E. WILDHABER  2,422,326
VARYING LEVERAGE GEARS
Filed Aug. 2, 1945  3 Sheets-Sheet 3
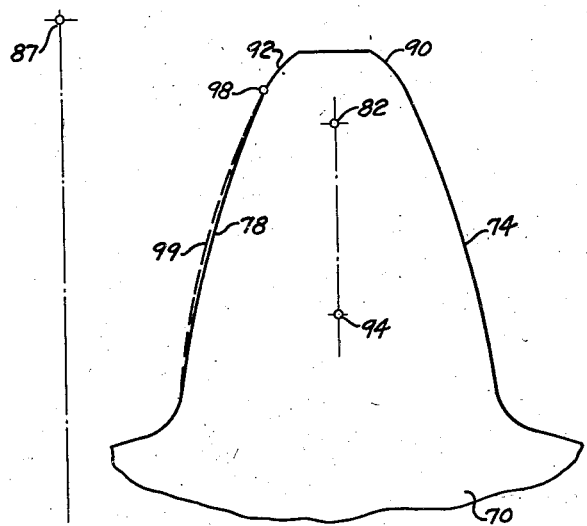
Fig. 12
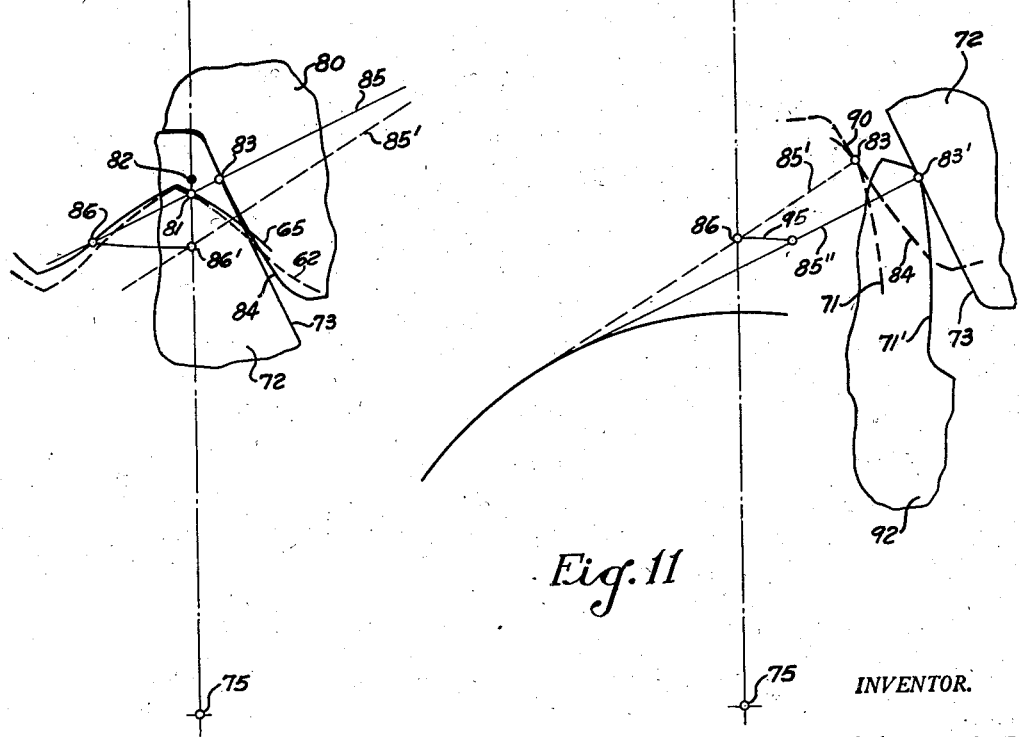
Fig. 11
Fig. 10
INVENTOR.
ERNEST WILDHABER
BY *signature*

Patented June 17, 1947

2,422,326

UNITED STATES PATENT OFFICE 2,422,326

VARYING LEVERAGE GEAR

Ernest Wildhaber, Brighton, N. Y., assignor to Gleason Works, Rochester, N. Y., a corporation of New York Application August 2, 1945, Serial No. 608,571

11 Claims. (Cl. 74—462)

The present invention relates to varying leverage or varying motion gears and particularly to varying leverage gears in which there is a cycle of variation in leverage or motion per tooth. Gears of this type are used in the differential mechanisms of automotive vehicles where it is desirable to provide some means for preventing complete loss of traction when one of the drive wheels slips. In a differential in which such gears are used, if the tractive power of one wheel is diminished due to slipping, the power transmitted to the other wheel will be increased and decreased alternately as the pinions and gears of the differential rotate in mesh. This alternate increase and decrease in power is intended to enable the vehicle to pull itself out of the mud or snow in which it may have been slipping.

In the commonly used type of varying leverage gears, the tooth profile consists of two distinctly different portions of small radius of curvature and of large radius of curvature, respectively. The portion of large radius of curvature, that is, the more nearly flat part of the tooth profile, extends for the greater portion of the height of the tooth profile, while the portion of small radius of curvature, that is, the sharply curved portion of the profile extends for only a short portion of the height of the profile lying adjacent the top of the tooth. It connects the main portion of the tooth profile with the top land of the tooth.

When gears of this previously known construction are in operation, the profile portions of the mating gears, which are of large radius curvature, mesh with each other while the short profile portion of small radius of curvature near the tips of the teeth of one gear mesh with the lower parts of the profile portions of the teeth of the mating gear which are of large radius of curvature. The contact between meshing profile portions, which are of large radius of curvature is excellent and these portions of mating tooth surfaces roll on one another with only a moderate amount of sliding. The short portions of the profiles which are of small radius of curvature have, however, much more sliding contact with the flat portions of the mating teeth. Moreover, on account of the large relative curvatures between the outer portions of the tooth profiles of one gear and the mating flat portions of the profiles of a mating gear, the surface stress when the short portions of the teeth are in contact is comparatively large.

The tooth profiles of this previously known type of varying leverage gears have, therefore, a strong portion and a weak portion. Unfortunately, the two portions are called upon to do about the same amount of work. The result is that the weak portions of the tooth profiles, that is, the portions of the tooth profiles near the tips of the teeth, wear rapidly in use. This condition of rapid wear is aggravated by the fact that the outer portion of the tooth profile is not only much curved but also has a rapidly varying curvature, the largest curvature being at the junction of this portion of the tooth profile with the profile portion which is of large radius of curvature. The portion at the junction of the two parts of the tooth profile is especially weak, because there is no profile overlap between the mating gears in this region, and the most curved portion of the tooth profile has to carry the load alone without help from another tooth.

For all of these reasons, varying leverage gears have heretofore been used only in drives where high tractive ability is a basic consideration, and the life of the gears, their cost of production, etc., are relative minor factors.

In one previous design of varying leverage gears, the major portions of the tooth profiles are of circular arcuate shape and the outer portions of the profiles of one gear are generated conjugate to the circular arcuate portions of the tooth profiles of the mate gear.

A primary object of the present invention is to provide a tooth shape for varying leverage gears which will be considerably stronger than the described prior known design. To this end, it is a purpose of the invention to provide varying leverage gears whose tooth profiles will still consist of a portion of relatively flat curvature extending for the major portion of the tooth height and of a top portion of relatively large curvature extending for the rest of the tooth height and lying adjacent the top of the tooth, but in which the much curved profile portion will be especially strengthened at what was the weakest point in the previously known design, namely, near the junction of the top portion of the profile with the flatter major portion of the profile.

A further object of the invention is to provide a new form of varying leverage gear in which the portions of the tooth profiles adjacent to tops of the teeth will be of circular arcuate shape or more nearly circular arcuate shape than in previous designs and in which the major portions of the tooth profiles will be noncircular.

A still further object of the invention is to provide varying leverage gearing in which the major portions of the tooth profiles will have minimum curvature near the centers of their heights and be more curved at their ends, resembling arcs of an ellipse, and thereby joining more smoothly the tops of the profiles.

Other objects of the invention will be apparent hereinafter from the specification and from the recital of the appended claims.

The present invention is applicable to bevel gears and spur gears alike. The gears may be produced in a generating process using straight sided cutting tools, or, in the case of bevel gears, may also be cut with a rotary face mill cutter of the spherical type. Bevel gears constructed according to this invention may be cut, for instance, on a machine constructed according to the U. S. patent to Carlsen and Johnson No. 2,354,181, issued July 25, 1944, which, when equipped with a suitable cam, permits of cutting both sides of a tooth space of a gear in one operation with a spherical cutter in an up and down roll process. This process is efficient and fast.

In the drawings:

Figs. 10 and 11 are further diagrammatic views illustrating the method of generating the tooth profiles; and Fig. 12 is a diagrammatic view showing how the main portion of the height of a tooth constructed according to the present invention compares with the main portion of the tooth profile of the described previously known type of varying leverage gears.

In Figs. 1 and 2, 15 and 16 denote, respectively, the two members of a pair of gears constructed according to this invention. The axes of these gears are designated 17 and 18, respectively. These views may be considered as showing either spur gears or bevel gears, the latter, of course, in their back cone developments.

Figures 1, 2, 3:
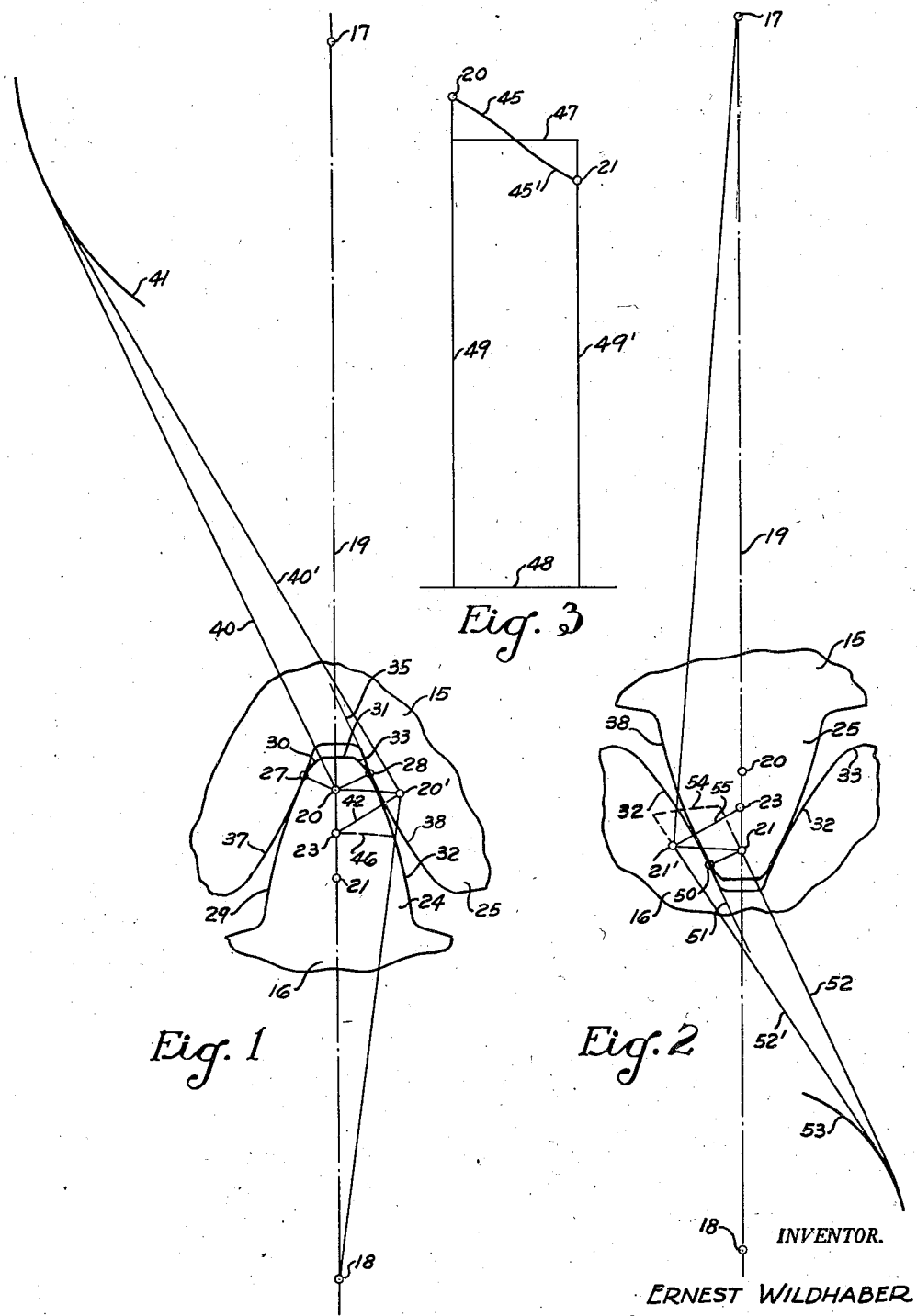
Figs. 1 and 2 are diagrammatic views illustrating the tooth shapes of mating gears constructed according to one embodiment of the present invention and showing, respectively, the mating gears in two different positions of mesh.
Fig. 3 is a diagrammatic view showing one step in the development of the tooth profiles.

During the mesh of a pair of varying leverage gears, the instantaneous axis of relative motion moves in the plane 19 of the centers of the gears between two extreme positions which are denoted in Figs. 1 and 2 at 20 and 21, respectively. These extreme positions are in the embodiment shown at nearly equal distances from the point 23 which would be the instantaneous axis of relative motion of gears of the ratio illustrated were these gears uniform motion gears having the same axes and the same numbers of teeth as the gears illustrated.

Distances 20—23 and 21—23 may be assumed at will. For instance, if $\phi$ denoted the pressure angle of the gears at the extreme positions of the instantaneous axes, one may assume these distances as about ⅜ (CP)·tan $\phi$, where CP denotes the circular pitch of the corresponding uniform motion gears. The distances 20—23 and 21—23 control the variation in leverage, which can be computed in known manner.

Fig. 1 shows the gears 15 and 16 in a position of mesh where the instantaneous axis is in its topmost position 20. Here a tooth 24 of the pinion 16 is on center in engagement with opposite side surfaces of two adjacent teeth 25 of the gear 15.

For convenience in analyzing the mesh of the gears, it will be assumed that they run together with zero backlash. Both sides of a tooth of the pinion are then in engagement simultaneously with the opposite sides of a tooth space of the gear. Here, 27 and 28 are the points of contact between the gear and pinion teeth, while 20—27 and 20—28, respectively, are the normals to the contacting tooth surfaces at these points of contact. These normals intersect the line of centers 17—18 of the gears in the instantaneous axis 20.

The gears have tooth profiles which for the major portion of the height of the teeth are of relatively large curvature and for the part of the tooth height adjacent the tip of the tooth are of relatively sharper curvature. Thus, the pinion tooth 24 has opposite side tooth surfaces whose profiles contain relatively flat portions 29 and 32, respectively, extending for the greater portion of the tooth height, and relatively much curved portions 30 and 33, respectively, which lie adjacent the tip 31 of the tooth. The points 27 and 28, respectively, are the points of juncture of the top and major portions of the opposite side tooth profiles of the pinion tooth. The major, less curved portion 29 at one side of the pinion tooth extends from the point 27 to the root of the tooth while the much curved portion 30 of this profile extends from the point 27 to the top 31 of the tooth. On the opposite side of the tooth, the less curved portion 32 of the tooth profile extends from the root of the tooth to the point 28, while the much curved portion 33 of the profile extends from the point 28 to the top land 31.

In the preferred embodiment of my invention, the radii of curvature of the much curved portions 30 and 33 of the teeth are no smaller than the distances 20—27 and 20—28 and preferably the center of curvature of said much curved portions of the tooth profile is at 20. The distances 20—27 and 20—28 are, of course, equal for symmetrical teeth.

We shall now determine how much leverage variation can be obtained where the center of curvature of the top portions 30 and 33 of the tooth profiles is at 20. It can be demonstrated mathematically that the rate of change in leverage, as the gears move from the positions shown in Fig. 1, depend only on the inclination of the tangent 35 at a point of contact 28 to the central plane 19, that is, only on the pressure angle of the tooth in this position. It is independent of the curvature of the mating tooth profile 38. In other positions of mesh, it is nearly independent of the moderate curvature of the major, flatter portion of the tooth profile 38. For this reason, we may determine the change in leverage as if the mating tooth profile were straight in the region engaged by the upper portion 33 of the pinion tooth. Straight line 40 is drawn through instantaneous axis 20 parallel to tangent 35, that is, it is drawn at an inclination to the line of centers 17—18 equal to the pressure angle $\phi$. The considered motion is the motion obtained by letting a point 20 of the pinion slide on line 40 of the gear.

As the pinion turns on its axis 18, the center 20 of curvature of the outer portions of its tooth profiles moves about the axis of the pinion 18 to a position 20', and during this movement the line 40 of the gear will turn about the gear axis 17 to a position 40'. The line 40 is tangent to a circle 41 circumscribed about the axis 17 of the gear, and the line 40' remains tangent to that circle. At point 20', relative motion of the two gears is along line 40'. The instantaneous axis of motion in this position of mesh is found by drawing line 42 normal to the said relative motion, that is, to line 40', and determining its point of intersection with the line of centers 17—18. This point happens in the case illustrated to coincide with point 23.

This procedure may readily be repeated for various positions 20', and a curve 45 (Fig. 3) may be plotted containing these points. The ordinates of this curve are the distances from the pinion center 18 to the instantaneous axis, and the abcissas are the angles of rotation of the pinion measured preferably on what would be the pitch circle were the gears uniform motion gears. Thus angle 20—18—20' is plotted as the length of an arc 46 shown in dotted lines in Fig. 1. Line 47 (Fig. 3) is a line representing the constant distances of the instantaneous axis from the axis of the pinion in uniform motion gears of the same ratio as the gears shown in Fig. 1. It is a line drawn parallel to the zero line 48 of the coordinate system. The curve 45 is drawn primarily to obtain its inclination to line 47 at its point of intersection with said line.

Fig. 2 shows a position of mesh of the gears 15 and 16 when the instantaneous axis is in its lowest position 21. A tooth 25 of the gear is then on the line of centers 17—18. Contact between tooth profile 38 of the gear tooth and mating tooth profile 32 of a pinion tooth is then at point 50. The normal to the contacting tooth surfaces at this point passes through instantaneous axis 21.

Here again we draw a straight line denoted at 52, through point 21 parallel to the tangent 51 to the mating tooth profiles at the point of contact 50, and analyze the varying leverage obtainable by letting curvature center 21 slide on straight line 52. In the rotation of the gears from the position shown in Fig. 2, point 21 moves, as a point of the gear, about the gear center 17. Thus, as the gears are rotated together, the point 21 will move to a position 21' and the line 52 will move to the position 52', remaining tangent, however, to the circle 53 to which the line 52 is tangent. This circle is circumscribed about the axis 18 of the pinion. The angle of rotation is again measured on the circle which corresponds to the pitch circle for uniform motion gears, namely, on an arc 54. The instantaneous axis of relative motion of the gears in this new position is the intersection point of the line of centers 17—18 and the normal 55 drawn perpendicular to the line 52' through the point 21'. For this new position the instantaneous axis happens to coincide with point 23.

Again we plot the distance of the instantaneous axis from the pinion center 18 in terms of the angle of rotation of the pinion measured on what would be its pitch circle were it a uniform motion gear. Thus, the ordinate of point 21 (Fig. 3) equals the distance 21—18 of Fig. 2. Another curve 45' is then obtained by plotting the position of the instantaneous axis 21 for various positions 21' of rotation of the gear about the axis of the pinion. It happens that in the instance shown the curve 45' for the different turning positions of instantaneous axis 21 blends with the curve 45 for different turning positions of the instantaneous axis 20. If these curves should happen, however, to be separated, the leverage variation may be increased. In other words, the vertical distance between points 20 and 21 (Fig. 3) may be increased by the amount of vertical separation of the two curves 45 and 45'. The curves themselves, also, may be changed.

If the curves 45 and 45' should interfere with one another then the leverage variation should be reduced. That is, the vertical distance between points 20 and 21 should be reduced until the two curves join smoothly. Other less desirable possibilities are to increase the pressure angle of the gears or to accept more tooth curvature by changing the inclinations of the curves so that they join.

There exists an imaginary basic rack or crown gear with infinitely thin tooth sides which can be interposed between the gear pair and which will contact with both members of the pair along the same lines along which said members contact with each other. This basic rack is characteristic of the motion which we want to determine. We want gears in which the outer tooth profile has a minimum radius of curvature which is not less than distance 20—27 or 20—28 (Fig. 1). The basic rack need not and usually connot be used in generation of the outer tooth profile, but describes the motion transmitted by the pair of gears and is used in the generation of the main portions of the tooth profiles to produce a main portion of the profile of one gear which will roll properly with both the outer and main portions of the profile of the mating gear. The basic rack or crown gear has a varying motion with respect to the motion of the two gears. Its speed at any one instant equals the speed of the pinion or gear at the instantaneous pitch point where the normal (42 or 55) intersects the line of centers 17—18. Its displacement for a very small angle $d\theta$ of rotation of the pinion equals the product of $d\theta$ on radians multiplied by the distance of the instantaneous axis from the pinion axis 18 plotted as an ordinate in Fig. 3. The abscissa in said figure is the angle of rotation of the pinion multiplied by a constant. The total displacement, is therefore, proportional to the area underneath curve 45—45', that is to the area between the ordinates 49 and 49', curve 45—45', and zero line 48.

In varying leverage gears, as in uniform motion gears, the pitch lines of the gears are the lines which roll on one another without sliding. In other words, the pitch line of a varying leverage gear is the locus of the various positions of the instantaneous axis of relative motion. The pitch line of the basic rack or crown gear may be obtained by plotting the ordinates of the curve 45—45' in terms of the rack or crown gear displacement. For the sake of brevity, we shall hereinafter refer only to the pitch line of the basic rack, but it is to be understood that that term is intended to include the pitch line of the basic crown gear. We are interested primarily in the inclination of the pitch line of the rack which corresponds to curve 45, at points 20 and 21 and at the intersection with line 47. That is, we are interested in the tangents at the points 20 and 21. Likewise, we are interested in the tangents at two points of the pitch line of the rack which corresponds to curve 45'.

It can be demonstrated that the pitch line inclination at points 20 and 21 with respect to the direction of motion equals the pressure angle $\phi$.

At the intersection point of curve 45 or curve 45' with line 47, the pitch line inclination is equal to the inclination of curve 45 or 45' to line 47. Broadly, the inclination $t$ with respect to line 47 of the tangent to the pitch line of the rack at any ordinate can be obtained from the plotted curve 45 or 45' by determining the inclination $t_0$ of said curve at the same ordinate, and the ratio of distance 18—23 to the ordinate. The latter would be 18—20 for point 20.

If we let $r_i$ denote the ordinate and $r$ the distance 18—23, we have:

$$\tan t = \frac{r}{r_i} \cdot \tan t_0$$

This relationship enables us also to consider centers of curvature for the outer portions of the tooth profiles which may lie on normal 20—28 but not necessarily coincide with point 20, and which may be anywhere along said normal.

The rack pitch line is preferably approximated by a parabola. Let the distance of any point on the pitch line above the line 47 be denoted by $y$ and hereafter to be called the ordinate. At points below line 47, the ordinates will then be negative. $y_1$ is the ordinate at point 20.

Let $x$ denote the abscissa in the direction of rack motion. $x=0$ at point 20. $t_1$ is the inclination of the pitch line at point 20 to the direction of rack motion and $t_r$ is the inclination at its intersection with line 47. The equation of the parabola can then be put down as:

$$y_1 - y = x \tan t_1 + cx^2$$

where $c$ is a constant to be determined hereinafter.

Through differentiation, we obtain:

$$-\frac{dy}{dx} = \tan t = \tan t_1 + 2cx$$

The intersection point of the parabola with line 47 is characterized by $y=0$ and $x=x_0$. For this position, we obtain from the first equation above:

$$y_1 = x_0 \tan t_1 + cx_0^2$$

Hence:

$$x_0 = \frac{-\tan t_1 + \sqrt{\tan^2 t_1 + 4cy_1}}{2c}$$

also:

$$\tan t_r = \tan t_1 + 2cx_0 = \sqrt{\tan^2 t_1 + 4cy_1}$$

and:

$$c = \frac{\tan^2 t_r - \tan^2 t_1}{4y_1}$$

Figure 4:
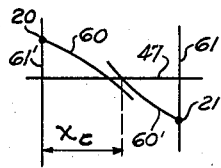
Fig. 4 is a diagrammatic view showing a step in the construction of the pitch line of the basic rack.

This determines constant $c$ and the first parabola. Fig. 4 shows this first parabola at 60. Another parabola 60' can be determined similarly to correspond to curve 45'. The two curves 60 and 60' are shown separated to keep the analysis general.

Let $-y_1$ be the ordinate of curve 60' at point 21, and let $x'$ be the abscissa measured to the left. $x'=0$ for point 21. $t_1'$ is the tangent inclination of the pitch line at point 21, ordinarily equal to the pressure angle $\phi$, and $t_r'$ is the tangent inclination at the intersection of the pitch line with line 47. The equation of the parabola 60' then is:

$$y_1 + y = x' \tan t_1' + c'x'^2$$

and $$\frac{dy}{dx'} = \tan t = \tan t_1' + 2c'x'$$

and $$c' = \frac{\tan^2 t_r' - \tan^2 t_1'}{4y_1}$$

The distance between the two end ordinates 61 and 61' can be put down initially as one half of the circular pitch of corresponding uniform motion gears, and may be denoted at $p$. Then $x=p-x$, and the equation for $\tan t$ can be written as:

$$\tan t = \tan t_1' + 2c'(p-x) = (\tan t_1' + 2c'p) - 2c'x$$

We shall now determine the abscissa $x_c$ where the two parabolas 60 and 60' have the same inclination $t$.

$$\tan t = \tan t_1 + 2cx_c = \tan t_1' + 2c'p - 2c'x_c$$

$$(2c+2c')x_c = \tan t_1' - \tan t_1 + 2c'p$$

Hence:

$$x_c = \frac{\tan t_1' - \tan t_1 + 2c'p}{2c+2c'}$$

Ordinarily $\tan t_1' = \tan t_1$ in which case:

$$x_c = \frac{2c'p}{2c+2c'}.$$

We can now determine the ordinates $y'$ and $y''$ at abscissa $x_c$ for the two curves 60 and 60'. Unless the parabolas touch each other exactly these ordinates will be slightly different. Half the difference is equal to:

$$\Delta y = \frac{y'' - y'}{2}$$

A positive value for $\Delta y$ indicates separation of the two curves; a negative value denotes interference. A single composite pitch line is obtained by displacing the parabolas vertically until they touch at a point whose abscissa is $x_c$.

Figure 5:
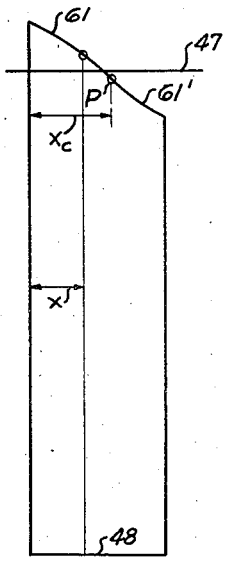
Fig. 5 is a diagrammatic view showing a further step in the construction of the pitch line of the basic rack.

The equations of the two parabolas with respect to line 47 remain the same except that $(y_1 + \Delta y)$ is used in place of $y_1$ alone. Fig. 5 shows this condition. The pitch line is composed of two oppositely curved parabolas 61 and 61' which join at point P where they have a common tangent. It is, therefore, a pitch line of double inflection.

The angles of rotation $\theta$ and $\theta_G$ of the pinion and of the gear, respectively, for various displacements of the final basic rack will now be determined. Let $r$ and $R$, respectively, denote the two pitch radii for a uniform motion pair of gears corresponding to the ratio shown here. Then:

$$dx = (r+y)d\theta = (R-y)d\theta_G$$

$$d\theta = \frac{dx}{r+y} \text{ and } d\theta_G = \frac{dx}{R-y}$$

where $$y = (y_1 + \Delta y) - x \tan t_1 - cx^2$$

in the range from $$x=0 \text{ to } x=x_c$$

and $$y = (p \tan t_1' + c'p^2 - y_1 - \Delta y) - x(\tan t_1' + 2pc') + c'x^2$$

where $x$ has any value between $x_c$ and $p$ or even beyond.

$$\theta = \int \frac{dx}{r+y}$$

which in the case of both parabolas can be expressed as:

$$\theta = \int \frac{dx}{b_0 + 2b_1 x + b_2 x^2}$$

where $b_0$, $b_1$, and $b_2$ are constants. On the parabola to the left $$b_0 = r + y_0 + \Delta y$$
$$2b_1 = -\tan t_1$$

and $$b_2 = -c$$

This is a known integral. Outside of an integration constant, it is:

$$\theta = \frac{1}{\sqrt{b_0 b_2 - b_1^2}} \cdot \arctan \frac{b_1 + b_2 x}{\sqrt{b_0 b_2 - b_1^2}}$$

when $$b_0 b_2 - b_1^2 > 0$$

and:

$$\theta = \frac{1}{2\sqrt{b_1^2 - b_0 b_2}} \cdot \log_e \frac{\sqrt{b_1^2 - b_0 b_2} - b_1 - b_2 x}{\sqrt{b_1^2 - b_0 b_2} + b_1 + b_2 x}$$

when $$b_1^2 - b_0 b_2 > 0$$

The absolute value of the quantity under the log sign should be used.

When $b_1^2 = b_0 b_2$, the solution is:

$$\theta = -\frac{1}{b_1 + b_2 x}$$

$\theta$ being used in radians.

First the turning angle $\theta_1$, which corresponds to the displacement $x_c$ of the rack, is determined with the constants of the first parabola. Then the constants of the second parabola are introduced, and the ordinate $x$ is determined for an additional angle of rotation equal to half the angular pitch minus $\theta_1$. If $n$ and $N$ denote, respectively, the tooth numbers of the pair of gears, this additional angle of rotation is:

$$\theta_2 = \frac{\pi}{n} - \theta_1$$

in radians and is $$= \frac{180°}{n} - \theta_1$$

in degrees.

With $$V = \sqrt{b_1^2 - b_0 b_2}$$

we get for the logarithmic function:
function:

$$C = \log_e \left[ \frac{V - b_1 - b_2 x_c}{V + b_1 + b_2 x_c} \right]$$

and:

$$\theta_2 = \frac{1}{2V} \left\{ \log_e \left[ \frac{V - b_1 - b_2 x}{V + b_1 + b_2 x} \right] - C \right\}$$

$\theta_2$ being measured in radians. And:

$$\frac{V - b_1 - b_2 x}{V + b_1 + b_2 x} = e^{(2V\theta_2 + C)} = k$$

$$V - b_1 - b_2 x = k[V + b_1 + b_2 x]$$

$$x b_2 (1 + k) = V(1 - k) - b_1(1 + k)$$

$$x = \frac{V(1 - k) - b_1(1 + k)}{b_2(1 + k)}$$

The procedure for the gear is just the same mathematically. Here also an $x$ value will be determined. It will usualy not be exactly the same as the one computed for the pinion. There will be a difference $\Delta x$.

Now the whole composite pitch line is shifted vertically a small distance $\Delta y'$ which is positive when the $x$ value for the pinion is smaller than for the gear. The new $y$ value is then equal to the old one plus $\Delta y'$. Thus for the first parabola, the new value is:

$$(y_1 + \Delta y + \Delta y') - x \tan t_1 - c x^2$$

Figure 6:
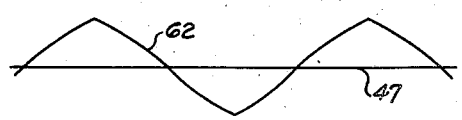
Fig. 6 is a diagrammatic view showing the pitch surface of the basic gear for gears constructed according to this invention.

The computation is then repeated and another pair of $x$ values is obtained. Interpolation can now be used to obtain equal values of $x$ for the pinion and the gear. Exact values are obtained by further repeating the computation and using even closer interpolation. This computation process is sometimes known as regula falsi. It determines the exact final position of the pitch line of the basic rack for a half pitch mesh which corresponds to a displacement of the instantaneous axis from one extreme position to the other. The pitch line for the return is preferably symmetrical to the portion already determined. A rack pitch line 62 for a whole pitch and more is shown in Fig. 6.

Figure 7:
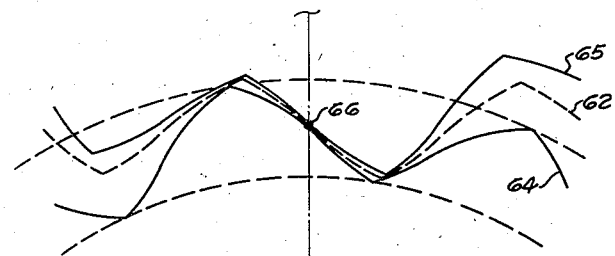
Fig. 7 is a diagrammatic view showing the pitch lines of a pair of mating gears and of their basic generating gear in contact.

Fig. 7 shows mating pitch lines 64 and 65 of the pinion and gear, respectively, and the pitch line 62 of the basic rack. These all roll together without sliding and contact with each other at point 66 on the line of centers 17—18.

The angle of rotation of the pinion and of the gear can be computed exactly with the above formulas, using the final constants for ordinate $y$. The pitch line of the pinion can be computed by spacing a distance $(r+y)$ on any radius vector which includes an angle $\theta$ with the zero position. The pitch line of the gear is obtained by spacing distance $(R-y)$ on the corresponding radius vector.

Spur gears constructed according to the present invention are preferably generated with the tool whose cutting edge or edges describe the tooth surface of a rack. The work and tool are moved relative to one another as if the rack represented by the tool were meshing with the varying leverage gear to be produced. A rack having plane tooth sides is preferably used in the generation, so simple straight-sided tools can be employed for generating the gears.

Straight-sided tools are also preferably employed in the production of bevel gears according to this invention when the gears are cut with reciprocatory tools. A preferred way of cutting varying leverage bevel gears, however, is with a face mill type gear cutter. A spherical cutter is preferably used, that is, a cutter whose cutting edges describe a sphere when the cutter is rotated on its axis. In bevel gears, the generation is from a crown gear rather than from a rack, as is readily understood, and, where reference is herein made to a rack, it is to be understood that this term may include, also, a crown gear.

Figure 8:
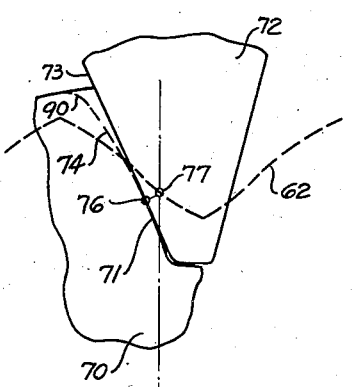
Figs. 8 and 9 are diagrammatic views illustrating the generation of opposite sides of the teeth of a gear constructed according to this invention.
Figure 9:
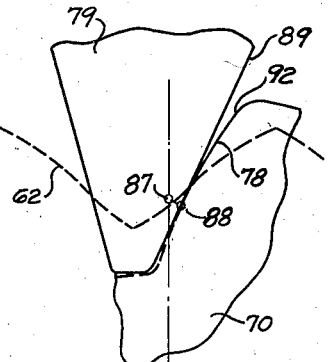

The method of generating the main portions of opposite sides of the teeth of a pinion 70 constructed according to this invention are illustrated in Figs. 8 and 9, respectively. Here the operations of cutting opposite sides of the teeth are shown separately, but the two sides of the teeth may be generated simultaneously, at least in part, with two separate cutting tools which are fed independently of one another. When a face mill type cutter is used, the two sides are cut successively with the outside and inside edges of the cutter, respectively, but preferably in one operation.

In Fig. 8, generation of the main portion 71 of the side 74 of a tooth of the pinion 70 is illustrated. Here a reciprocating cutting tool 72 is employed having a straight side-cutting edge 73. Generation of the tooth profile is effected by reciprocating the tool across the face of the work while effecting a relative rolling movement between the tool and work at a varying velocity as though the gear being cut were rolling with a basic gear whose pitch surface is at 62. In Fig. 8, the cutting edge 73 of the tool is in contact with the side surface 71 being generated at a point 76, while 77 is the instantaneous axis of motion between work and tool. 75 denotes the axis of the work.

Fig. 9 shows the generation of the main portion 78 of an opposite tooth side of the pinion 70. Here a tool 79 is employed having a straight side-cutting edge 89. The tool is reciprocated across the face of the blank while a relative rolling movement at a varying ratio is effected between the tool and work as though the gear being cut were rolling with a basic gear represented by the tool whose pitch surface is at 62. 87 is the instantaneous axis of motion between the tool and pinion and 88 is the point of contact between the side-cutting edge 89 of the tool and the profile portion 78 being generated.

The more sharply curved upper portion of the tooth profile may be generated in the same operation with the generation of the main portion of the tooth profile but the computation is different. Generation is still from a rack or crown gear having the same tooth sides as before, but this rack is no longer a basic rack. The steps which are gone through are illustrated in Fig. 10. This figure illustrates the generation of that portion of the tooth profile of the gear which is to mesh with the outer portion of the tooth profile of the pinion. Here it is assumed that the same tool 72 is used in generation of the gear tooth profile as was used in generation of the mating tooth profile of the pinion. The tool 72 and gear 80 are shown in a position of mesh where the instantaneous axis 81 is near its extreme position 82. 83 is a point of contact between the side-cutting edge 73 of the tool and the side profile 84 of the gear. A tooth normal 85 at the point of contact 83 is perpendicular to the given tool profile and passes through the instantaneous axis 81 where it intersects the pitch lines 62 and 65 of rack and gear. It further intersects the gear pitch line 65 in a point 86. Point 83 is a point of contact between the gear tooth profile 84 and the cutting edge 73 of the tool, and between the gear tooth profile 84 and the mating tooth profile in the position shown, and which in another position of mesh of the gears will be the point of contact between tooth profile 84 and the outer portion of the mating tooth profile. In Fig. 11, the gear is shown turned on its axis 87 to a position where the point 86 is on the line of centers 87—75. Normal 85 is then in the position 85'. In this position the point 83 will be a point of contact with the conjugate top portion 90 of the profile of a tooth of the mating pinion 70.

To get conjugacy between the pinion tooth profile and the gear tooth profile, the top portions 90 and 92 of pinion tooth profiles at opposite sides of the pinion tooth must be generated conjugate to the lower portions of the mating gear tooth profiles. The pressure angle of the top portion 90 of the pinion tooth profile is, however, greater than the pressure angle of the cutting tool 72. To generate point 83 of the top portion 90 of the pinion tooth profile, therefore, the pinion tooth profile 71 must be turned about the pinion axis 75 to a position 71' where point 83 reaches new position 83' and the inclination of the tangent at point 83' of the top portion of the tooth profile will be the same as the pressure angle of the side cutting edge 73 of the tool. In this movement, the normal moves to position 85'' traveling in an arc 95 about the pinion axis 75.

Proceeding in the same manner for other points any number of coordinated pinion and tool positions, that is, rack positions, may be obtained. These relative positions of pinion and rack are then reproduced in the generation of the top portion of the pinion profile. The same procedure is used for both members of the pair and applies to both sides of the teeth.

Computation may, of course, be substituted for drawings. In the case of bevel gears, the plane problem becomes a problem of spherical trigonometry as is readily understood.

Ordinarily, the top portions of the tooth profiles are substantially circular arcs centered on the tooth center. Fig. 12 shows a tooth of a varying leverage pinion constructed according to my invention. The top portions 90 and 92 at opposite sides of the teeth join the main side portions 74 and 78, respectively, smoothly and without any ridge. Point 98 is, for instance, the point of juncture of top portion 92 and main portion 78. The main portions 74 and 78 of the profiles are not circular arcs. A circular arc is shown in dotted lines at 99 for comparison. The main portions of each tooth profile has a minimum curvature near the middle of its height and is more curved at the tooth bottom and also near its upper end, that is, near the point 98. For these reasons, the main portion of each tooth profile bears a resemblance to a portion of an ellipse. This, however, is only incidental. The main characteristic is the motion produced by the wholly convex working portions 92 and 78 or 90 and 74 of the tooth profile. This is a varying motion which changes at a faster rate at the intermediate positions of the instantaneous axis than near the two end positions 82 and 94 of the instantaneous axis. This enables us to obtain correctly formed upper portions 90 and 92 without excessive curvature near their junctures with the main portions 74 and 78 of the tooth profiles. This means, too, that the maximum rate of change in leverage occurs at a point in the more flatly curved portion of the tooth profile, namely, at the middle of that portion, and not at the juncture of the flat and sharply curved portions of the tooth profiles as is the case with tooth shapes heretofore in use.

While the invention has been described in connection with particular embodiments thereof, it is capable of further modification, and this application is intended to cover any variations, uses, or adaptations of the invention following, in general, the principles of the invention and including such departures from present disclosure as come within known or customary practice in the gear art and as may be applied to the essential features hereinbefore set forth and as fall within the scope of the invention or the limits of the appended claims.

Having thus described my invention, what I claim is:

1. A varying leverage gear whose tooth profiles comprise one curve for the main portion of the tooth height and a different curve adjacent the tips of the teeth, in which the main portion of each tooth profile has a varying radius of curvature and the top portion of each tooth profile is of approximately circular arcuate shape.

2. A varying leverage gear whose tooth profiles comprise one curve for the main portion of the tooth height and a different curve adjacent the tips of the teeth, in which the main portion of each tooth profile has a varying radius of curvature and the top portion of each tooth profile is of approximately circular arcuate shape and has its center of curvature on a line bisecting the tooth.

3. A varying leverage gear whose tooth profiles comprise one curve for the main portion of the tooth height and a different curve adjacent the tips of the teeth, the top portions of the tooth profiles being of circular arcuate shape and of relatively large curvature and the lower portions of the tooth profiles being noncircular and of relatively small curvature.

4. A varying leverage gear whose tooth profiles comprise one curve for the main portion of the tooth height and a different curve adjacent the tips of the teeth, the top portions of the tooth profiles being of relatively large curvature and the lower portions of the tooth profiles being of relatively small curvature, and the minimum curvature of the lower portions of the tooth profiles near being the middle of the height of such portions and said lower portions being most curved at their junctures with the top portions of the tooth profile and at their lower ends.

5. A pair of varying leverage gears whose tooth profiles comprise one curve for the main portion of the tooth height and a different curve adjacent the tips of the teeth, in which the main portions of the tooth profiles are flatter at the middle of said main portions than at the upper and lower ends thereof.

6. A varying leverage gear whose tooth profiles comprise one curve for the main portion of the tooth height and a different curve adjacent the tips of the teeth, in which the main portions of the tooth profiles are such as may be generated conjugate to a basic gear whose pitch lines are curves of double inflection.

7. A varying leverage gear whose tooth profiles comprise one curve for the main portion of the tooth height and a different curve adjacent the tips of the teeth, in which the main portions of the tooth profiles are such as may be generated conjugate to a basic gear whose pitch lines are double parabolic curves.

8. A pair of varying leverage gears, each of whose tooth profiles comprises one curve for the main portion of the tooth height and a different curve adjacent the tips of the teeth, in which the instantaneous axis of motion of the gears shifts back and forth along the line of centers of the gears in a complete cycle per pitch, the main portions of the tooth profiles of at least one member of the pair having varying profile curvature with the minimum curvature of each main portion being at a point intermediate the ends of said main portion.

9. A varying leverage gear whose tooth profiles comprise one curve for the main portion of the tooth height and a different curve adjacent the tips of the teeth, in which the main portion of each tooth profile is convex and has a varying radius of curvature and in which the main portion of the tooth profile is flatter at its middle than at its upper and lower ends.

10. A varying leverage gear whose tooth profiles comprise one curve for the main portion of the tooth height and a different curve adjacent the tips of the teeth, in which both portions of the tooth profiles are convex and in which the main portion of each tooth profile has a varying radius of curvature and is flatter at the middle of its height than at its upper and lower ends.

11. A pair of varying leverage gears, each of whose tooth profiles comprises an outer portion adjacent the tip of the tooth which is approximately a circular arc, and a main portion extending for the rest of the active height of the tooth and which is a curve of varying curvature conjugate to the outer portion of the tooth profile of the mate gear.

ERNEST WILDHABER.

REFERENCES CITED

The following references are of record in the file of this patent:

UNITED STATES PATENTS

| Number | Name | Date |
| --- | --- | --- |
| 1,690,931 | Hammar | Nov. 6, 1928 |
| 2,009,915 | Davis | July 30, 1935 |
| 2,305,835 | Woods | Dec. 22, 1942 |
| 2,307,394 | Davis | Jan. 5, 1943 |
| 2,308,558 | Wildhaber | Jan. 19, 1943 |
| 2,354,161 | Carlsen, et al | July 25, 1944 |